(12) United States Patent
Gerty (10) Patent No.: US 9,410,504 B2
(45) Date of Patent: *Aug. 9, 2016

(54) MIXER FOR PULSED EGR

(71) Applicant: PACCAR Inc, Bellevue, WA (US)

(72) Inventor: Michael Gerty, Bellingham, WA (US)

(73) Assignee: PACCAR Inc, Bellevue, WA (US)

( * ) Notice: Subject to any disclaimer, the term of this patent is extended or adjusted under 35 U.S.C. 154(b) by 396 days.

This patent is subject to a terminal disclaimer.

(21) Appl. No.: 13/923,223

(22) Filed: Jun. 20, 2013

(65) Prior Publication Data

US 2014/0373819 A1    Dec. 25, 2014

(51) Int. Cl.

| F02B 33/44 | (2006.01) |
| F02M 25/07 | (2006.01) |
| F01N 1/00 | (2006.01) |
| F02B 47/08 | (2006.01) |
| F02B 29/04 | (2006.01) |
| F01N 13/08 | (2010.01) |
| F01N 13/10 | (2010.01) |
| F01N 13/18 | (2010.01) |
| F01N 3/00 | (2006.01) |

(52) U.S. Cl.
CPC ........... *F02M 25/0707* (2013.01); *F01N 13/08* (2013.01); *F02B 29/0475* (2013.01); *F02M 25/0724* (2013.01); *F02M 25/0749* (2013.01); *F01N 3/00* (2013.01); *F01N 13/107* (2013.01); *F01N 13/1805* (2013.01); *F02M 25/0703* (2013.01); *F02M 25/0706* (2013.01); *F02M 25/0717* (2013.01); *F02M 25/0722* (2013.01); *F02M 25/0726* (2013.01); *Y02T 10/121* (2013.01); *Y02T 10/144* (2013.01)

(58) Field of Classification Search
CPC .......... F02M 25/0703; F02M 25/0707; F02M 25/0722; F02M 25/0724; F02M 25/0726; F02M 25/0717; F02M 25/0706; F02M 25/0749; F01N 13/08; F01N 13/107; F01N 13/1805; F01N 3/00; F02B 29/0475; Y02T 10/144
USPC .................... 60/605.2, 323–324; 123/568.11, 123/568.12, 568.15, 568.17
See application file for complete search history.

(56) References Cited

U.S. PATENT DOCUMENTS

| 3,776,207 | A | * | 12/1973 | Simko | ................. F02M 25/073 |
| | | | | | 123/568.12 |
| 4,056,933 | A | * | 11/1977 | Nohira | ............... F02M 25/0749 |
| | | | | | 60/313 |
| 5,987,884 | A | * | 11/1999 | Kibe | ...................... F02B 37/00 |
| | | | | | 60/286 |
| 6,220,233 | B1 | | 4/2001 | Pierpont | |
| 6,425,381 | B1 | * | 7/2002 | Rammer | ............ F02M 25/0796 |
| | | | | | 60/605.2 |

(Continued)

FOREIGN PATENT DOCUMENTS

| DE | 9421145 U1 | * | 5/1995 | ......... F02M 25/0707 |
| DE | 102004015108 A1 | * | 10/2005 | ......... F02M 25/0749 |

(Continued)

*Primary Examiner* — Thai Ba Trieu
(74) *Attorney, Agent, or Firm* — Christensen O'Connor Johnson Kindness PLLC (57) ABSTRACT

A mixer for pulsed exhaust gas recirculation (EGR) includes a fresh intake air conduit having an inlet opening configured to be placed into fluid communication with a fresh intake air source, an EGR pocket having an upstream opening in fluid communication with an upstream air source and a downstream opening in fluid communication with the fresh intake air conduit, and an EGR conduit configured to introduce pulsed EGR into the EGR pocket.

20 Claims, 6 Drawing Sheets

(56) References Cited

U.S. PATENT DOCUMENTS

| | | | | |
|---|---|---|---|---|
| 6,543,230 | B1* | 4/2003 | Schmid | F02M 25/0749 60/605.2 |
| 6,789,531 | B1* | 9/2004 | Remmels | F02M 25/0749 60/605.2 |
| 7,389,770 | B2* | 6/2008 | Bertilsson | F02M 25/0707 60/605.2 |
| 7,444,815 | B2* | 11/2008 | Baumgard | F02M 25/0749 60/605.2 |
| 7,490,466 | B2* | 2/2009 | Robel | F01N 3/035 60/301 |
| 7,721,541 | B2* | 5/2010 | Roberts, Jr. | F02M 25/0749 60/605.2 |
| 7,757,677 | B2 | 7/2010 | Dobrila | |
| 7,788,923 | B2* | 9/2010 | Rowells | F02M 25/0749 60/605.2 |
| 8,291,891 | B2* | 10/2012 | Alger, II | F02M 25/0749 123/568.11 |
| 8,316,829 | B2 | 11/2012 | Piper | |
| 8,561,599 | B2* | 10/2013 | Gingrich | F02M 25/0707 123/568.17 |
| 8,752,532 | B2* | 6/2014 | Korenaga | F02M 25/0749 123/568.11 |
| 8,893,687 | B2* | 11/2014 | Gingrich | F02M 25/0749 123/568.11 |
| 8,904,786 | B2* | 12/2014 | Hayman | F02M 25/0749 60/605.2 |
| 8,935,917 | B2* | 1/2015 | Hayman | F01N 13/06 123/568.11 |
| 8,944,034 | B2* | 2/2015 | Gingrich | F02M 25/0749 60/605.2 |
| 8,996,281 | B2* | 3/2015 | Gingrich | F02M 25/0749 123/568.17 |
| 2009/0308070 | A1* | 12/2009 | Alger, II | F02M 25/0749 123/568.11 |
| 2011/0041495 | A1* | 2/2011 | Yager | F02M 25/0722 60/605.2 |
| 2011/0041817 | A1* | 2/2011 | Guerry | F02M 25/0722 123/568.17 |
| 2011/0079009 | A1 | 4/2011 | Krätschrner | |
| 2012/0023930 | A1* | 2/2012 | Lischer | F02M 25/0722 60/598 |
| 2012/0216530 | A1* | 8/2012 | Flynn | F02M 25/0722 60/605.2 |
| 2012/0297768 | A1* | 11/2012 | Lischer | F02M 25/0722 60/605.2 |
| 2014/0020382 | A1* | 1/2014 | Subramanian | F02M 25/074 60/605.2 |
| 2014/0202433 | A1* | 7/2014 | Dane | F02M 25/0749 123/568.11 |
| 2014/0223903 | A1* | 8/2014 | Keating | F02M 25/0722 60/605.2 |
| 2014/0305416 | A1* | 10/2014 | Gukelberger | F02M 25/0707 123/568.21 |
| 2014/0373528 | A1* | 12/2014 | Gerty | F02M 25/0707 60/605.2 |
| 2015/0354477 | A1* | 12/2015 | Leone | F02M 25/0749 123/406.26 |
| 2015/0369180 | A1* | 12/2015 | Leone | F02M 25/0749 123/52.1 |

FOREIGN PATENT DOCUMENTS

| | | | | |
|---|---|---|---|---|
| FR | 2980823 | A1* | 4/2013 | F02M 25/0749 |
| JP | 2009287434 | A* | 12/2009 | F02M 25/0749 |
| WO | WO 2011145203 | A1* | 11/2011 | F02M 25/0704 |

* cited by examiner

MIXER FOR PULSED EGR

BACKGROUND

Exhaust gas recirculation (EGR) systems were introduced in the early '70s to reduce an exhaust emission that was not being cleaned by the other smog controls. Nitrogen oxide and nitrogen dioxide (both commonly referred to as "NOx") are formed when temperatures in the combustion chamber get too hot. At 2500 degrees Fahrenheit or hotter, the nitrogen and oxygen in the combustion chamber can chemically combine to form nitrous oxides, which, when combined with hydrocarbons and the presence of sunlight, produces an ugly haze in our skies known commonly as smog.

In a typical automotive engine, EGR is used as a technique to reduce the amount of NOx formed during the internal combustion process. EGR involves the recirculation of a portion of an engine's inert exhaust gas back to the engine's cylinders to dilute the incoming air mix with the inert exhaust gas. This process lowers the adiabatic flame temperature, increases the specific heat capacity, and in the case of diesel engines, reduces the amount of excess oxygen of the incoming air mix. Because NOx forms faster at higher temperatures, the combination of increased heat capacity and lower combustion temperature reduces the amount of NOx formed.

Combustion engines perform work through combusting hydrocarbons to create a pressure pulse generating a pressure differential across the engine, and further converting that pressure into mechanical work. Maintaining this pressure differential is essential to the efficient functioning of the engine, and therefore the introduction of backpressure into the engine is undesirable. However, many internal combustion engines use a portion of the generated pressure difference to operate an EGR system, blending exhaust gas with intake air. As lower emissions are targeted and the demand for fuel efficiency and power density of combustion engines continues, many designers of internal combustion engines are challenged to improve the management of pressure within the engine.

In order for EGR to flow into the intake manifold, exhaust gas pressures must be higher than intake gas pressures. Traditionally, this requires that the exhaust manifold pressure be maintained higher than the intake manifold pressure. The requirement for higher exhaust manifold pressure is undesirable, as it creates extra backpressure on the engine. As such, the engine pistons need to work harder to push the exhaust out, which reduces the work that reaches the crankshaft. Accordingly, the use of EGR compromises the efficiency of the engine.

The control of EGR flow rates is typically achieved by the use of controlled backpressure using a turbocharger, often a variable geometry turbocharger (VGT). The VGT must control the desired work to compress inlet air and the desired exhaust manifold pressure to control the EGR flow rate. As a result, the control of the VGT is complex.

Typical heavy duty engines run about 15% to 30% EGR, depending on the operating condition of the engine and the type of after treatment system used. In most heavy duty engines, the exhaust manifold is common between all of the cylinders, and a pipe connects the exhaust manifold to a control valve, an EGR cooler, and then to the intake manifold. Thus, to vary the amount of EGR run (to maximize engine efficiency and minimize NOx emissions), complex sensor and control systems must be used to measure certain system aspects and control the valve, the VGT, the after treatment system, etc. This complex EGR system increases manufacturing complexities and costs, which can also lead to warranty issues.

Thus, it can be appreciated that there is a need for a lower cost, simplified EGR system and components that reduce backpressure on the engine and improve engine efficiency.

SUMMARY

A mixer for pulsed exhaust gas recirculation (EGR) includes a fresh intake air conduit having an inlet opening configured to be placed into fluid communication with a fresh intake air source, an EGR pocket having an upstream opening in fluid communication with an upstream air source and a downstream opening in fluid communication with the fresh intake air conduit, and an EGR conduit configured to introduce pulsed EGR into the EGR pocket.

In one embodiment the mixer for pulsed EGR may be configured for use with a fixed positive displacement exhaust gas recirculation (EGR) system that includes an intake manifold in fluid communication with a fresh intake air source, an exhaust manifold, and an engine having at least one EGR cylinder and at least one non-EGR cylinder. The at least one EGR cylinder is in fluid communication with the intake manifold such that a fixed volume of exhaust gas flows from the at least one EGR cylinder to the intake manifold, and the at least one non-EGR cylinder is in communication with the exhaust manifold such that exhaust gas flows from the at least one non-EGR cylinder into the exhaust manifold. In this embodiment, the mixer for pulsed EGR is configured to mix fresh intake air with exhaust gas from the at least one EGR cylinder. The mixer includes a fresh intake air conduit having an inlet opening in fluid communication with the fresh intake air source and an outlet opening in fluid communication with the intake manifold. The mixer further includes a pocket assembly having a pocket defined by a pocket conduit having an upstream opening in fluid communication with an upstream air source a downstream opening in fluid communication with the fresh intake air conduit. The mixer further includes an EGR conduit in fluid communication with the at least one EGR cylinder and the pocket conduit for allowing exhaust gas to flow into the pocket conduit.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein.

DETAILED DESCRIPTION

Figure 1:
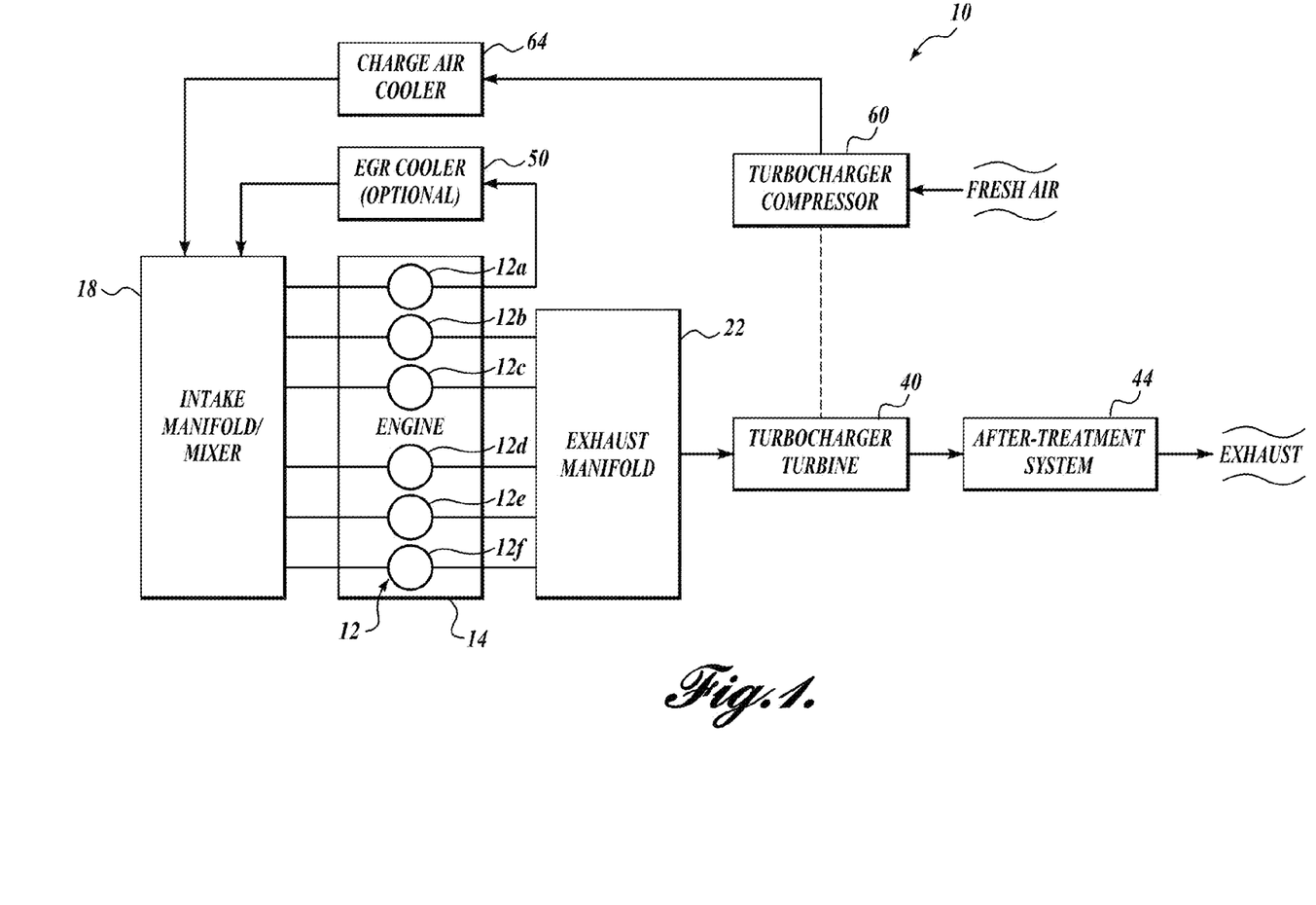
FIG. 1 is a schematic view of a fixed positive displacement EGR system formed in accordance with a first exemplary embodiment of the present disclosure.

A fixed positive displacement EGR system 10 formed in accordance with a first exemplary embodiment of the present disclosure may best be seen by referring to FIG. 1. The fixed positive displacement EGR system 10 is generally configured to place at least one cylinder of a combustion engine (or any other predetermined, fixed number of cylinders) into direct fluid communication with an intake manifold. Substantially all of the exhaust from the at least one cylinder (or other fixed number of cylinders) is pushed from the engine to the intake manifold. As such, a complicated control system, which may use valves, variable geometry turbochargers (VGTs), sensors, controls, etc., is not needed.

Although the fixed positive displacement EGR system 10 is described with respect to heavy duty diesel engines, it should be appreciated that the fixed positive displacement EGR system 10 may instead be used with any suitable engine assembly. Accordingly, the illustrations and description herein should not be seen as limiting the scope of the claimed subject matter.

Furthermore, the described features, structures, and characteristics of the fixed positive displacement EGR system 10 may be rearranged, reconfigured, or combined with aspects of other embodiments to configure the system for use with an intended application. Moreover, one skilled in the art would recognize that the fixed positive displacement EGR system 10 may be implemented without one or more of the specific details, methods, components, materials, etc., without departing from the scope of the present disclosure. In that regard, well-known structures, materials, or operations will not be shown or described in detail, in order to avoid obscuring aspects of the present disclosure.

Referring to FIG. 1, the fixed positive displacement EGR system 10 will now be described in detail. The fixed positive displacement EGR system 10 includes a combustion engine 14 having a set of cylinders 12 that are fluidly coupled to an intake manifold 18. Although the engine 14 may have any suitable number of cylinders, in the depicted embodiment, the engine 14 includes six cylinders 12a-12f that define the set of cylinders 12. Each of the cylinders 12a-12f is fluidly coupled to the intake manifold 18 for receiving a mixture of fresh air and recirculated exhaust gas (hereinafter sometimes referred to as "EGR", "EGR flow", "EGR gas", or similar).

However, only the EGR from a fixed, limited number of cylinders is introduced into the intake manifold to be used for the combustion process. In that regard, a select number of the six cylinders 12a-12f are in fluid communication with an exhaust manifold 22 that exhausts gas to the atmosphere, and a select number of the six cylinders 12a-12f are in fluid communication with the intake manifold 18 to introduce EGR back into the engine 14.

In the depicted embodiment, cylinders 12b-12f are fluidly coupled to the exhaust manifold 22 for exhausting gas to the atmosphere. The exhaust gas from cylinders 12b-12f flows into the exhaust manifold 22, and ultimately into the atmosphere. Before exiting to the atmosphere, the exhaust manifold 22 directs the exhaust gas through a turbocharger turbine 40. The turbine 40 powers a turbocharger compressor 60, which compresses fresh intake air for introduction into the intake manifold 18 (as is well known in the art).

It can be appreciated that the exhaust gas from cylinders 12b-12f flowing into the exhaust manifold 22 for release into the atmosphere is not used as EGR flow. In that regard, a standard turbocharger turbine 40, rather than a VGT for inducing a variable back pressure on the exhaust manifold 22, may be used. After passing through the turbine 40, the exhaust gas may pass through a suitable after-treatment system 44 for reducing the oxides of nitrogen (NOx) and particulate matter from the exhaust gas before it is released into the atmosphere.

At least one of the cylinders of the set of cylinders 12 exhausts gas to the intake manifold 18 to provide EGR flow. In the depicted embodiment, the EGR flow from cylinder 12a is introduced into the intake manifold 18, and the EGR flow is mixed with fresh intake air for use by all of the cylinders 12a-12f.

Any suitable structure or configuration may be used to direct the flow of exhaust gas from cylinder 12a to the intake manifold 18. For instance, the exhaust manifold 22 may be fluidly coupled to cylinders 12b-12f, and a separate conduit, manifold, etc., may be fluidly coupled to cylinder 12a to direct the EGR flow to the intake manifold 18. As another example, the exhaust manifold 22 may be fluidly coupled to all the cylinders 12a-12f, with a bypass wall, valve, etc., fluidly isolating the EGR flow from cylinder 12a and directing the EGR flow into the intake manifold 18. Thus, it should be appreciated that any suitable configuration or design may be used.

With all of the EGR from cylinder 12a flowing into the intake manifold 18 each combustion cycle, no controls, valves, sensors, or the like, are required to vary the level of EGR into the intake manifold 18. Thus, in effect, the fixed positive displacement EGR system 10 is an "uncontrolled" EGR system.

Moreover, with only a select number of cylinders being used for EGR, the back pressure on the engine 14 is reduced. In typical EGR systems, the exhaust manifold is in fluid communication with all of the engine cylinders. For instance, in a typical EGR system, the exhaust manifold would be in fluid communication with cylinders 12a-12f. In such a typical EGR system, a desired amount of EGR is taken from all the cylinders and introduced back into the intake manifold (where the desired amount is determined and controlled through valves, sensors, controls, etc.). With all of the cylinders being used for EGR, the backpressure on the engine is very high since the EGR must be pushed from all the cylinders back into the intake manifold.

In comparison, when pushing EGR from only one or a select number of cylinders, the backpressure is significantly lower. As such, the non-EGR cylinders run much more efficiently. With lower backpressure on the non-EGR cylinders, a cheaper, simpler turbocharger turbine may be used.

In the depicted embodiment, the exhaust gas from cylinder 12a is pushed to the intake manifold 18 after passing through an optional EGR cooler 50. The EGR cooler 50 may be used to further reduce NOx emissions; and therefore, limit the number of cylinders needed for EGR flow. For instance, with the use of an EGR cooler, the system 10 may operate within emission limits by using only one cylinder for EGR flow, as opposed to two or more cylinders.

However, as noted above, the EGR cooler 50 is optional; and therefore, the system 10 may operate without the EGR cooler 50 such that the exhaust gas from cylinder 12a is pushed directly to the intake manifold 18. In the alternative, the system 10 may include an EGR cooler bypass having a control valve, or similar, to selectively allow the exhaust gas from cylinder 12a to pass through the EGR cooler 50. For instance, during start-up or warm-up of the vehicle, it is most efficient to push uncooled, hot exhaust to the intake manifold 18.

An EGR cooler typically uses engine coolant to cool the EGR by heat exchange. As a result, the engine coolant is subjected to increased thermal load, thereby requiring increased engine coolant system capacity in EGR systems. However, with a fixed number of cylinders being used to supply a limited amount of EGR for the system 10, the thermal load on the engine coolant system is minimized.

The required number of cylinders for producing a sufficient amount of EGR may also depend upon, for instance, the efficiency of the aftertreatment system 44. With the embodiment depicted in FIG. 1 (using only cylinder 12a for EGR flow), the inventors have found that the engine will have a fixed EGR rate of about 16.7%. It should be appreciated by one of ordinary skill in the art that the EGR rate may be changed as needed through configuration of the EGR system 10. For instance, the EGR rate may be increased by placing two or more cylinders into communication with the intake manifold. Thus, the embodiment of the fixed positive displacement EGR system 10 depicted in FIG. 1 is exemplary only, and may be modified or adapted to fit the intended application.

It should also be appreciated that in certain, non-standard operating circumstances, it would be beneficial to terminate all EGR flow to the engine 14. For instance, if the engine coolant temperature is low, it can cause soot or other material to be deposited into the EGR cooler 50 and into the intake manifold 18. Thus, it would be beneficial to switch to a "non-EGR mode" if the coolant falls below a certain threshold temperature.

Figure 2:
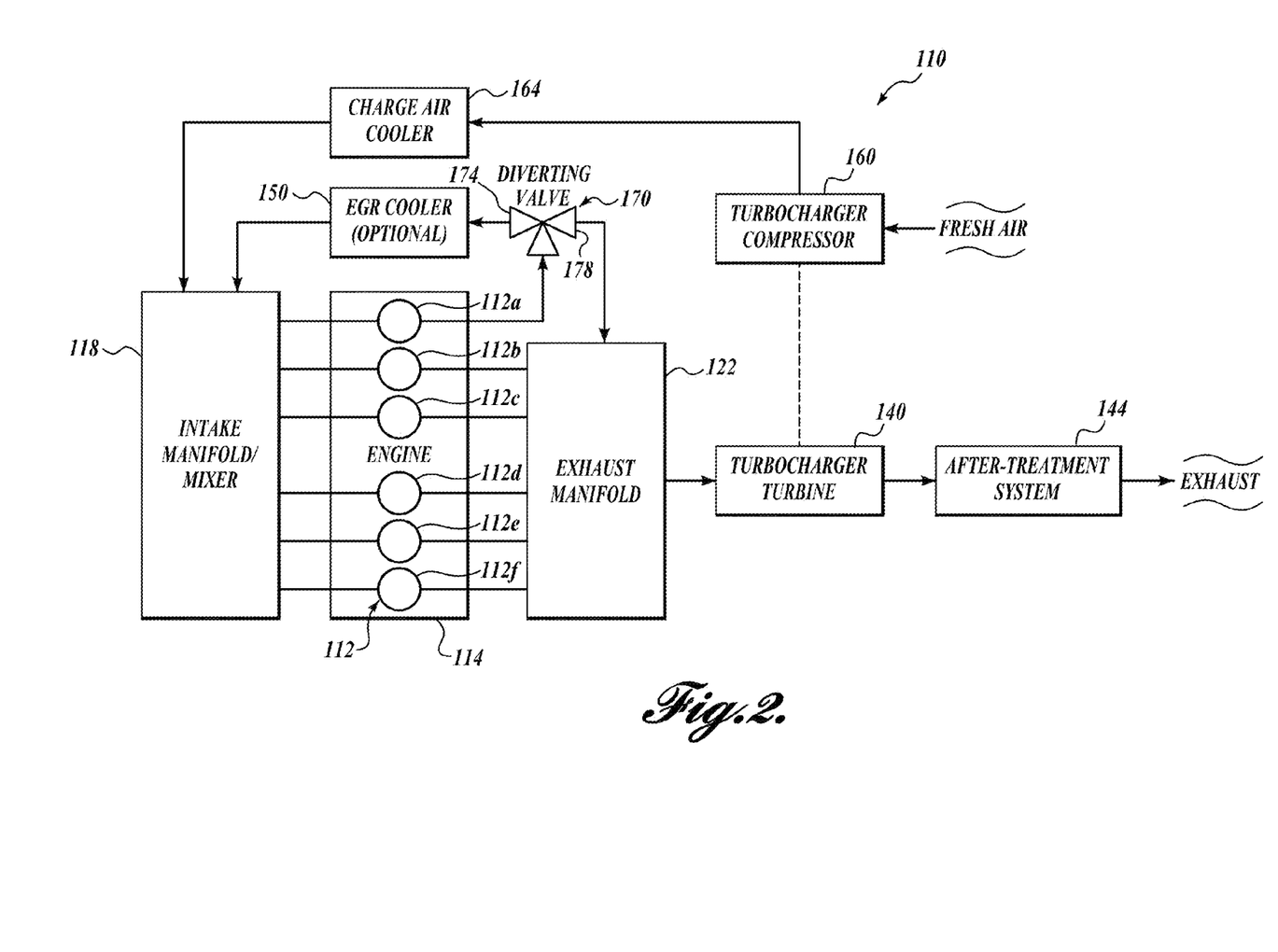
FIG. 2 is a schematic view of a fixed positive displacement EGR system formed in accordance with a second exemplary embodiment of the present disclosure.

FIG. 2 depicts an exemplary alternate embodiment of a fixed positive displacement EGR system 110 suitable for switching between EGR and non-EGR modes. The fixed positive displacement EGR system 110 is substantially identical to the fixed positive displacement EGR system 10 shown in FIG. 1 except that the system 110 includes a diverting valve assembly 170 configured to switch the system 110 between EGR and non-EGR modes.

The diverting valve assembly 170 is a suitable two-way valve assembly in fluid communication with cylinder 112a, the intake manifold 118 (or the optional EGR cooler 150), and the exhaust manifold 122. The diverting valve assembly 170 is configured to direct the flow of exhaust gas from cylinder 112a to either the intake manifold 118 in EGR mode, or the exhaust manifold 122 in non-EGR mode.

In EGR mode, a first valve 174 of the diverting valve assembly 170 is opened to allow the flow of EGR gas from the cylinder 112a optionally to the EGR cooler 150 and into the intake manifold 118. At the same time, a second valve 178 of the diverting valve assembly 170 is closed to prevent flow to the exhaust manifold 122. In this manner, the EGR gas flows into the intake manifold 118 and is used for exhaust gas recirculation.

In non-EGR mode, the second valve 178 of the diverting valve assembly 170 is opened to allow exhaust gas to flow from cylinder 112a to the exhaust manifold 122. At the same time, the first valve 174 of the diverting valve assembly 170 is closed to prevent the flow of exhaust gas from cylinder 112a to the intake manifold 118. In this manner, the exhaust gas from cylinder 112a exits to the atmosphere, rather than being used for exhaust gas recirculation.

Any suitable sensors, controls, and/or manual switches may be used to switch the diverting valve assembly 170 between EGR and non-EGR modes (e.g., to open and close the first and second valves 174 and 178 of the diverting valve assembly 170). Moreover, it should be appreciated that the first and second valves 174 and 178 may instead be separate and independent, controlled by independent sensors, controls, switches, etc.

Referring back to FIG. 1, and as noted above, the EGR flow from cylinder 12a is introduced into the intake manifold 18 (after optionally passing through the EGR cooler 150), and mixed with a fresh intake air stream that passes through the turbocharger compressor 60. The compressor 60 increases the pressure on the intake side of the engine 14 by compressing the fresh intake air stream, allowing more fuel to be combusted in the set of cylinders 12. Before entering the intake manifold 18, the compressed air may flow through a charge air cooler (CAC) 64 downstream of the compressor 60. Any CAC 64 suitable for cooling and condensing the air before introduction into the intake manifold 18 may be used. The compressed, cooled fresh air combined with the EGR flow from cylinder 12a (with the mixture of fresh air and EGR sometimes hereinafter referred to as "charge") flows from the intake manifold into each of the cylinders 12a-12f for use in the internal combustion process.

As noted above, in a typical EGR system, all of the engine cylinders are fluidly coupled to the exhaust manifold, and the EGR flow amount is adjusted through sensors, controls, valves, etc. With all of the cylinders coupled to the exhaust manifold, the flow of EGR into the intake manifold is substantially constant; and therefore, substantially even across all of the cylinders for the combustion process. In other words, there is substantially no issue with pulsations in the EGR flow leading to the intake manifold. However, with the EGR flow coming from only a single cylinder (or another fixed number of cylinders, such as two, three, etc.), the incoming pulsed EGR must be sufficiently mixed with the fresh intake air to create a substantially even distribution of EGR across the cylinders. In that regard, a suitable EGR mixer, such as a turbulator, or other well-known device, may be integrated within or otherwise configured for use with the intake manifold 18.

Although a turbulator or the like would help mix the pulsed EGR from cylinder 12a with the fresh intake air, a turbulator does not account for the EGR pulses. In the depicted fixed displacement EGR system 10, there is one pulse of EGR for every six intake strokes of a cylinder piston (or, for instance, twice every six intake strokes if two cylinders are used for EGR). With only one pulse of EGR mixing with the fresh intake air every six intake strokes, the charge for use by the cylinders 12a-12f is not a homogeneous mixture of EGR and fresh intake air. Accordingly, some cylinders receive more EGR than other cylinders.

Figure 3:
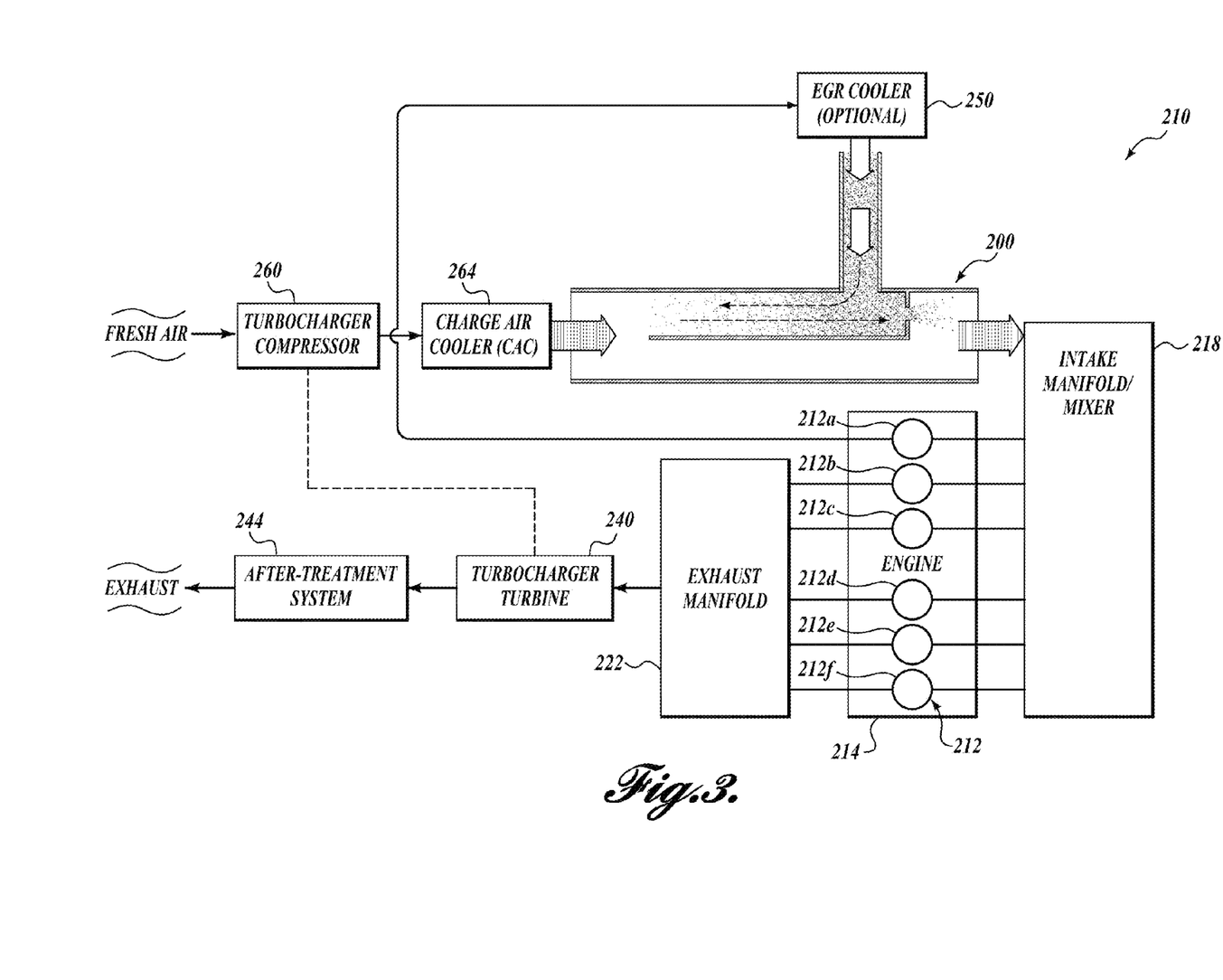
FIG. 3 is a schematic view of a fixed positive displacement EGR system formed in accordance with a third exemplary embodiment of the present disclosure.
Figure 4:
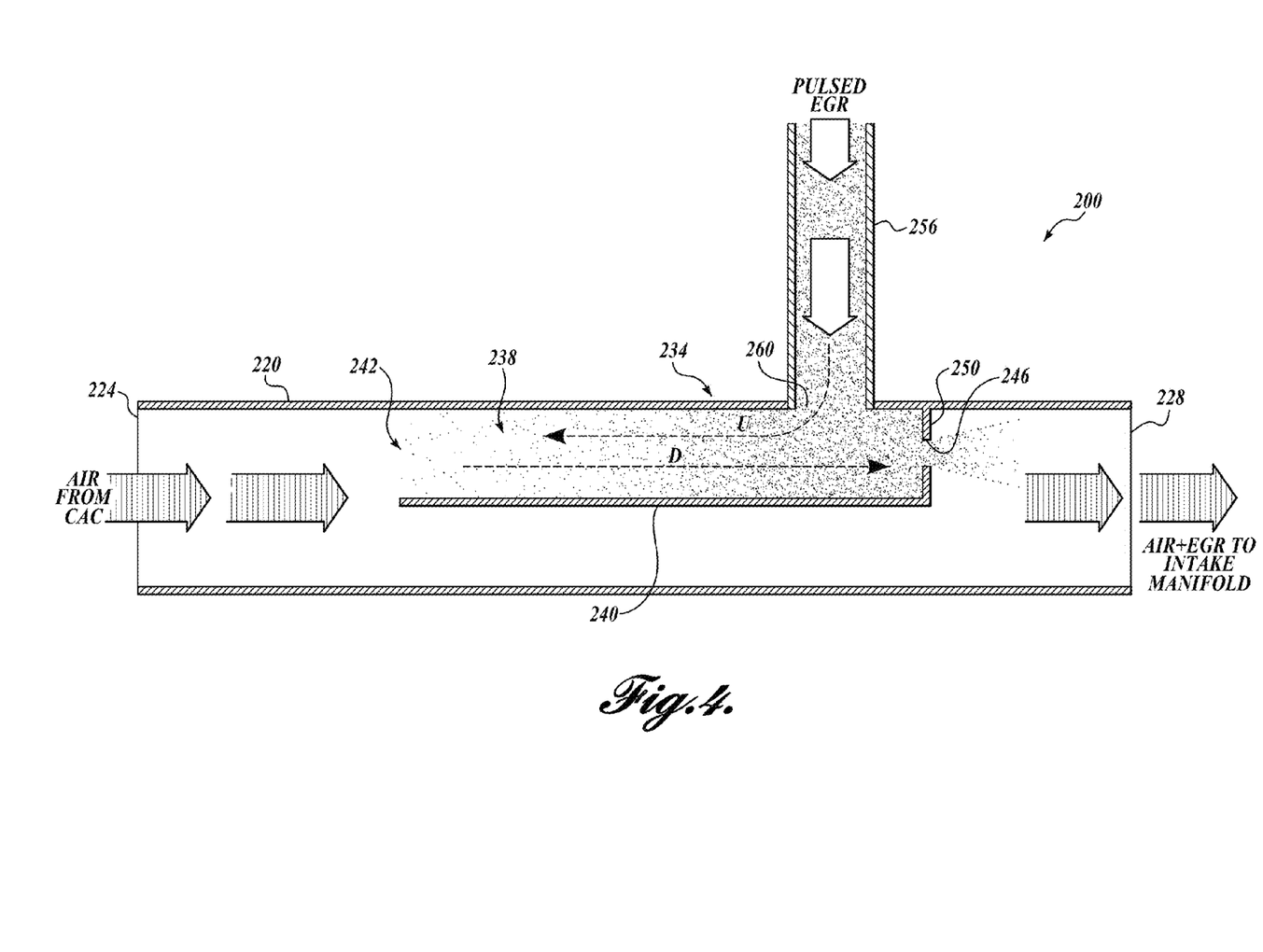
FIG. 4 is a mixer assembly of the fixed positive displacement EGR system of FIG. 3.

Referring to FIGS. 3 and 4, an exemplary embodiment of a mixer for pulsed EGR 200 configured to distribute and mix EGR with fresh intake air will now be described. The mixer for pulsed EGR 200 will be described with reference to a fixed positive displacement EGR system 210 that is substantially identical to the fixed positive displacement EGR system 10 described above. However, it should be appreciated that the mixer for pulsed EGR 200 may instead be used with any suitable EGR system, such as the fixed positive displacement EGR system 110. Thus, the description and illustrations herein should not be seen as limiting.

Referring first to FIG. 3, the fixed positive displacement EGR system 210 having a mixer for pulsed EGR 200 will first be briefly described. The fixed positive displacement EGR system 210 is substantially similar to the fixed positive displacement EGR system 10 described above, except that the fixed positive displacement EGR system 210 includes the mixer for pulsed EGR 200. In that regard, similar reference numerals in the '200 series have been used in FIG. 3 to denote similar components to those shown in FIG. 1.

The mixer for pulsed EGR 200 is in fluid communication with both the fresh intake air and the EGR from cylinder 212*a*. More specifically, the mixer for pulsed EGR 200 is disposed between and in fluid communication with the charge air cooler (CAC) 264, and the intake manifold 218. The mixer for pulsed EGR 200 is also disposed between and in fluid communication with cylinder 212*a* (or EGR cooler 250 if used) and the intake manifold 218.

Referring to FIG. 4, the mixer for pulsed EGR 200 will now be described in detail. The mixer for pulsed EGR 200 includes a fresh intake air conduit 220, such as a pipe, having an inlet opening 224 in fluid communication with the CAC 264, and an outlet opening 228 in fluid communication with the intake manifold 218. As such, the fresh intake air flows from the inlet opening 224 toward the outlet opening 228. The fresh intake air conduit 220 may be made from any suitable material capable of withstanding higher temperatures of pulsed EGR from cylinder 212*a*, such as cast aluminum or other metals, certain plastics, etc.

The mixer for pulsed EGR 200 further includes an EGR pocket assembly 234 configured to distribute pulsed EGR into the fresh intake air stream flowing through the fresh intake air conduit 220. The EGR pocket assembly 234 includes an EGR pocket 238 configured to fluidly receive both the fresh intake air stream flowing through the fresh intake air conduit 220 and a pulse of EGR from cylinder 212*a*.

The EGR pocket 238 is configured to receive and temporarily store a predetermined amount of EGR. The EGR pocket 238 is defined by a divider, partition, conduit, etc., disposed within the interior of the fresh intake conduit 220. In the depicted embodiment, the EGR pocket 238 is defined by an EGR pocket conduit 240 secured to or otherwise formed on an interior surface of the fresh intake air conduit 220. For instance, the EGR pocket conduit 240 may be separately formed and thereafter secured to the interior surface of the fresh intake air conduit 220, or the EGR pocket conduit 240 may instead be integrally formed within the interior of the fresh intake air conduit 220 through a suitable casting or molding process.

The EGR pocket conduit 240 includes an upstream opening 242 at one end and an downstream opening 246 at the opposite end, with the position of the upstream and downstream openings 242 and 246 positioned nearest the inlet and outlet openings 224 and 228, respectively, of the fresh intake air conduit 220. The upstream opening 242 of the EGR pocket conduit 240 is configured to allow the flow of fresh intake air into the EGR pocket conduit 240. In that regard, the size and shape of the upstream opening 242 may be substantially equal to the cross-sectional size and shape of the EGR pocket conduit 240. However, it should be understood that the inlet size opening may be increased or decreased to adjust the volume of fresh intake air flow into the EGR pocket conduit 240.

The downstream opening 246 of the EGR pocket conduit 240 is smaller in size than the upstream opening 242 to temporarily store and slowly release EGR from the EGR pocket conduit 240. For instance, the downstream opening 246 may be defined within an end face 250 extending substantially transversely across the downstream end of the EGR pocket conduit 240. The size of the downstream opening 246 may be about one-sixth (⅙) of the cross-sectional size of the fresh intake air conduit 220 to distribute the pulsed EGR generated from one of the six cylinders 212*a*-212*f* into the fresh intake air stream.

It should be appreciated that the size of the downstream opening 246 may be increased if more than one cylinder is used to generate pulsed EGR. For instance, if two of the six cylinders 212*a*-212*f* are used to generate EGR, the downstream opening 246 may be about ⅖ (or ⅓) of the cross-sectional size of the fresh intake air conduit 220. Moreover, the size of the downstream opening 246 may be increased or decreased to likewise increase or decrease the volume of EGR flowing out of the pocket conduit 240 to help create a substantially homogeneous mixture of EGR and fresh intake air.

As noted above, the pocket conduit 240 is in fluid communication with an EGR conduit 256 for receiving a pulse of EGR from cylinder 212*a*. In that regard, the EGR pocket conduit 240 is of a suitable cross-sectional size and shape to store roughly the volume of pulsed EGR generated from cylinder 212*a* during a single engine cycle. It should be appreciated that if more than one cylinder is used to generate EGR, the size of the EGR pocket 238 may be increased to store an increased volume of pulsed EGR.

An EGR opening 260 is defined in the fresh intake air conduit 220 for placing the EGR conduit 256 into fluid communication with the pocket conduit 240. The size of the EGR opening 260 may be substantially the same as or larger than the cross-sectional size of the EGR conduit 256 to allow the pulse of EGR to flow freely into the pocket conduit 240. However, it can be appreciated that in certain instances, it would be beneficial to decrease the size of the EGR opening 260 to slow the introduction of pulsed EGR into the pocket conduit 240. Nevertheless, the size of the EGR opening 260 is larger than the size of the downstream opening 246 in the pocket conduit 240. In this manner, the incoming pulse of EGR enters the pocket conduit 240 at a first flow rate, and the EGR exits the pocket conduit 240 at a second, slower flow rate through the smaller downstream opening 246. With the EGR exiting the pocket conduit 240 at a slower rate than it enters the pocket conduit 240, the EGR must be temporarily stored within the pocket conduit 240 before exiting through the downstream opening 246.

To help facilitate the temporary storage of EGR within the pocket conduit 240, the EGR opening 260 is positioned near the downstream opening 246 of the pocket conduit 240. As such, when pulsed EGR flows into the pocket conduit 240, the pulsed EGR initially flows upstream toward the upstream opening 242 of the pocket conduit 240, as indicated by arrow U. The pulsed EGR initially flows upstream within the pocket conduit 240 because there is less restriction at the upstream opening 242, due to the fact that the upstream opening 242 is larger in size than the downstream opening 246.

The upstream flow of EGR is ultimately pushed in the opposite, downstream direction by the pressure of the incoming fresh intake air entering the pocket conduit 240, as indicated by arrow D. The incoming fresh intake air pushes the EGR toward the downstream opening 246, and the EGR (mixed with at least some fresh intake air) is eventually pushed out of the downstream opening 246.

Although the majority of the upstream flow of EGR is eventually pushed downstream by the incoming fresh intake air, it can be appreciated that a small percentage of the EGR may flow out of the upstream opening 242 of the pocket conduit 240 and into the interior of the fresh intake air conduit 220. As such, it would be beneficial if the EGR pocket conduit 240 is positioned at least somewhat downstream of the inlet opening 224 of the fresh intake air conduit 220. In this manner, fresh intake air may flow past the upstream opening 242 of the pocket conduit 240, thereby pushing any overflowing EGR (i.e., EGR exiting the upstream opening 242 of the pocket conduit 240) toward the outlet opening 228 of the pocket conduit 240.

The pulsed EGR is stored within the pocket conduit 240 and slowly released into a downstream portion of the fresh intake air conduit 220 near its outlet opening 228. The substantially constant, metered EGR releases into the fresh intake air conduit 220 to mix with the fresh intake air flowing therethrough. In this manner, a constant flow of EGR is introduced into the flowing fresh intake air for reintroduction into the intake manifold 218. As such, the intake manifold 218 has a constant, substantially homogeneous flow of EGR mixed with fresh intake air (i.e., charge) for use by all the cylinders 212a-212f during each of their intake strokes.

A turbulator or other mixer may be used to further mix the metered EGR with the fresh intake air before or upon reaching the intake manifold 218. In that regard, the mixer 200 may be disposed between the pocket assembly 234 and the intake manifold 218 for mixing the metered EGR with the fresh intake air before reaching the intake manifold 218. The mixer 200 may also be incorporated within the intake manifold 218 for mixing the metered EGR with the fresh intake air within the intake manifold 218, and before being used by the cylinders 212a-212f.

Referring to FIGS. 5a-5d and 6a-6d, the flow of EGR and fresh intake air for a complete internal combustion engine cycle, both without and with a mixer for pulsed EGR 200, respectively, will now be described. As will become apparent from the description that follows, the use of a mixer for pulsed EGR 200 introduces a substantially constant, homogeneous flow of charge into the intake manifold 218 for use by all the cylinders 212a-212f.

Referring first to FIGS. 5a-5d, the flow of EGR and fresh intake air for a complete engine cycle without a mixer for pulsed EGR 200 is depicted. FIGS. 5a-5d will be hereinafter described with reference to the EGR system 10 depicted in FIG. 1. However, it should be appreciated that the any other suitable EGR system, such as EGR system 110, may instead be used.

Figure 5A:
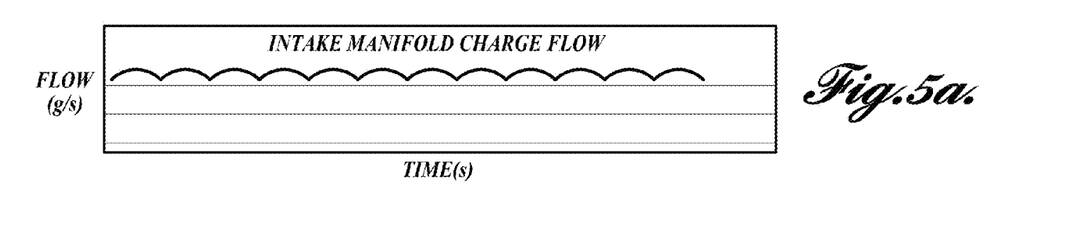
FIG. 5a is a graphical depiction of intake manifold charge flow of an EGR system of FIG. 1 or 2.

FIG. 5a depicts the flow of charge into the intake manifold 18 for use by the cylinders 12a-12f during the internal combustion process. The charge from the intake manifold 18 is drawn into each of the cylinders 12a-12f during the intake stroke of each cylinder, creating a substantially cyclical flow pattern of charge drawn into the intake manifold 18. Although a constant flow of charge is drawn into the intake manifold 18, the charge is not a substantially homogeneous mixture of EGR and fresh intake air.

Figure 5B:
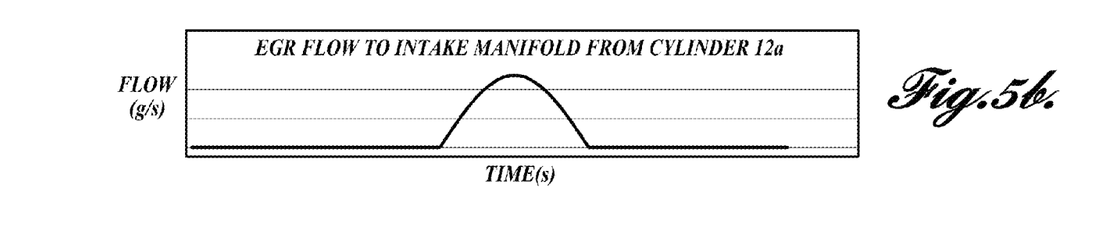
FIG. 5b is a graphical depiction of EGR flow into an intake manifold of an EGR system of FIG. 1 or 2.
Figures 5C, 5D:
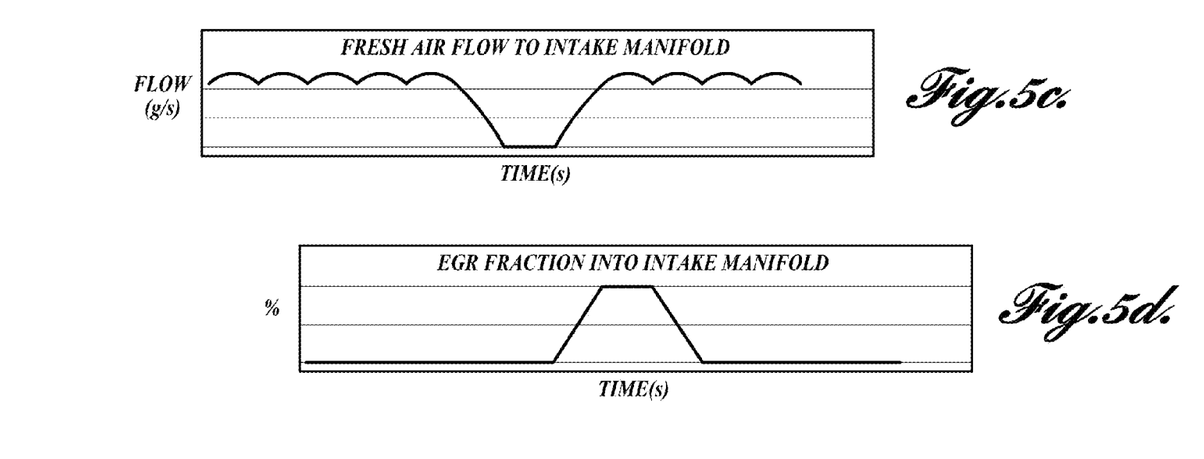
FIG. 5c is a graphical depiction of fresh air flow into an intake manifold of an EGR system of FIG. 1 or 2.
FIG. 5d is a graphical depiction of EGR fraction into an intake manifold of an EGR system of FIG. 1 or 2.

Rather, referring to FIG. 5b, EGR flows from cylinder 12a into the intake manifold 18 every sixth cycle. Referring to FIG. 5c, the fresh intake air flows into the intake manifold 18 constantly (due to the constant draw after each cylinder cycle), except when the EGR flows into the intake manifold 18. With the cylinders 12a-12f constantly drawing air from the intake manifold 18 (as shown in FIG. 5a), it can be appreciated that each cylinder does not receive a homogeneous mixture of EGR and fresh intake air. Rather, certain cylinders will receive more EGR during the EGR pulse into the intake manifold 18 (as shown in FIG. 5b), and certain cylinders will receive more fresh intake air when fresh intake air is flowing into the intake manifold 18 (as shown in FIG. 5c).

The percentage of EGR flowing into the intake manifold 18 relative to the percentage of fresh intake air changes depending on the stage in the engine cycle. Referring to FIG. 5d, the percentage of EGR, or the EGR fraction flowing into the intake manifold is close to 0% when the fresh intake air is being drawn into the intake manifold 18 (as shown in FIG. 5c), and the EGR fraction flowing into the intake manifold is close to 100% when the EGR is being pulsed into the intake manifold 18 (as shown in FIG. 5b). Thus, the air mixture within the intake manifold is not a constant, homogeneous mixture of EGR and fresh intake air.

Referring to FIGS. 6a-6d, the flow of EGR and fresh intake air for a complete internal combustion engine cycle with a mixer for pulsed EGR 200 is depicted. FIGS. 6a-6d will be hereinafter described with reference to the EGR system 210 depicted in FIG. 3. However, it should be appreciated that any other suitable EGR system may instead be used.

Figure 6A:
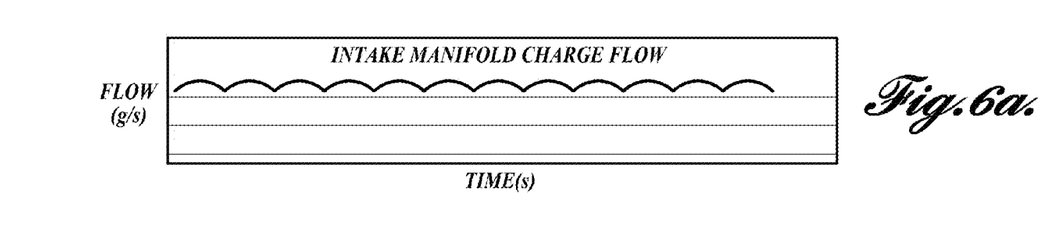
FIG. 6a is a graphical depiction of intake manifold charge flow of the EGR system of FIG. 3.

FIG. 6a depicts the flow of charge into the intake manifold 218 from the mixer 200 for use by the cylinders 212a-212f during the internal combustion process. The charge from the intake manifold 218 is drawn into each of the cylinders 212a-212f during the intake stroke of each cylinder, which creates a substantially cyclical flow of charge into the intake manifold 218 (substantially identical to the flow of charge shown in FIG. 5a).

Figure 6B:
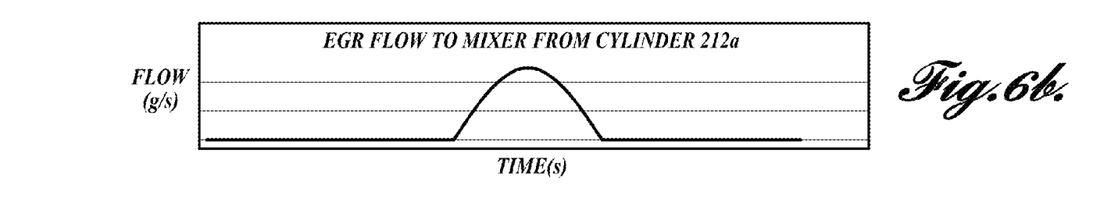
FIG. 6b is a graphical depiction of EGR flow into a mixer of the EGR system of FIG. 3.

Referring to FIG. 6b, an EGR pulse flows from cylinder 212a into the mixer 200 every sixth cycle. Thus, the amount of EGR flowing into the mixer 200 is substantially equal to zero except when cylinder 212a pulses EGR into the mixer 200.

As noted above with reference to FIG. 4, the EGR pulse flows through the EGR conduit 256 and into the EGR pocket conduit 240. With the size of the EGR opening 260 in the EGR pocket conduit 240 larger than the size of the downstream opening 246, the incoming pulse of EGR enters the pocket conduit 240 at a first flow rate and backfills the EGR pocket conduit 240, as indicated by arrow U. After backfilling the EGR pocket conduit 240, the volume of EGR within the pocket conduit 240 is a first volume substantially equal to the volume of gas exhausted by cylinder 212a.

The upstream flow of EGR is ultimately pushed in the opposite, downstream direction by the pressure of the incoming fresh intake air entering the pocket conduit 240, as indicated by arrow D. The incoming fresh intake air pushes the EGR toward the downstream opening 246, and the EGR is eventually pushed out of the smaller downstream opening 246 at a second, slower flow rate. As the EGR is pushed out of the downstream opening 246, the volume of EGR within the EGR pocket conduit 240 slowly decreases.

Figure 6C:
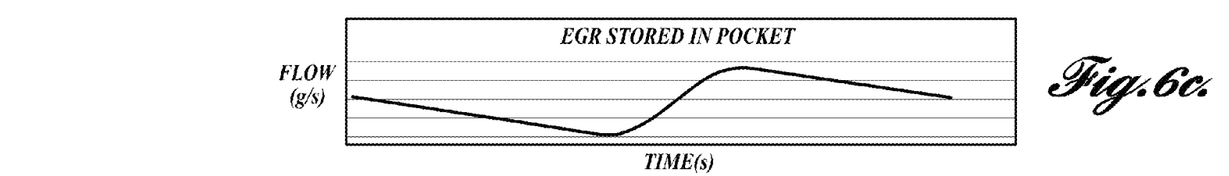
FIG. 6c is a graphical depiction of the volume of EGR in an EGR pocket of the EGR system of FIG. 3.

The changing volume of EGR in the EGR pocket conduit 240 is depicted in FIG. 6c. In particular, the first larger volume of EGR in the EGR pocket conduit 240 (resulting from the flow of EGR into the EGR pocket conduit 240 at the first faster flow rate) is represented by the first rise in the curve. The second smaller volume of EGR in the EGR pocket conduit 240 (resulting from the release of EGR from the EGR pocket conduit 240 at the second slower flow rate) is depicted by the subsequent, less steep decline in the curve. This cycle repeats every time a new pulse of EGR is introduced into the EGR pocket conduit 240 to substantially fill the pocket and slowly release the EGR out of the EGR pocket conduit 240.

As further noted above with reference to FIG. 4, the pulsed EGR is stored within the EGR pocket conduit 240 and slowly released into a downstream portion of the fresh intake air conduit 220. The substantially constant, metered EGR continuously mixes with the fresh intake air flowing through the fresh intake air conduit 220. In this manner, a constant flow of EGR is introduced into the flowing fresh intake air for reintroduction into the intake manifold 218. As such, the intake manifold 218 has a constant, substantially homogeneous flow of charge for use by all the cylinders 212a-212f during each of their intake strokes.

Figure 6D:
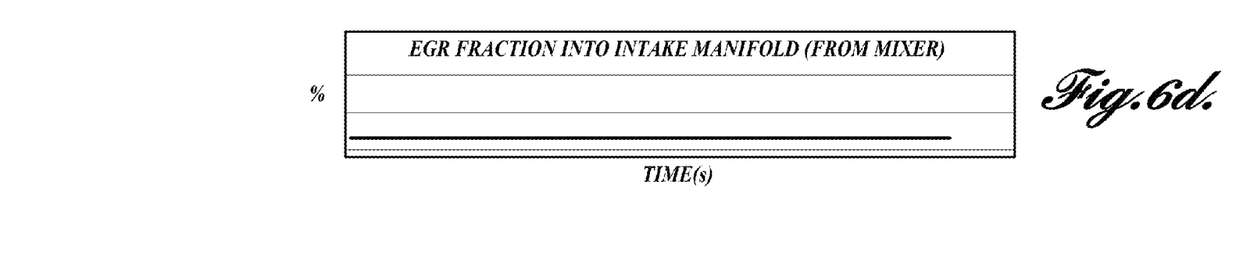
FIG. 6d is a graphical depiction of EGR fraction into an intake manifold of the EGR system of FIG. 3.

FIG. 6d depicts the percentage of metered EGR in the charge flowing into the intake manifold 218 relative to the percentage of fresh intake air. The percentage of EGR relative to fresh intake air, or the EGR fraction flowing into the intake manifold 218 is substantially constant, as indicated by the substantially linear, horizontal curve. In contrast, without the mixer 200, the EGR flow into the intake manifold 218 is either about 100% (when the EGR is being pulsed) or about 0% (when there is no EGR pulse), as shown in FIG. 5d. Thus, it can be appreciated that the mixer 200 creates a constant, substantially homogeneous flow of charge into the intake manifold 218 for use by all the cylinders 212a-212f.

While illustrative embodiments have been illustrated and described, it will be appreciated that various changes can be made therein without departing from the spirit and scope of the present disclosure. For instance, the EGR pocket 238 may instead be formed exterior of the fresh intake air conduit 220. In such an alternative embodiment, a turbine or other suitable device may be used to draw the EGR toward the upstream opening 242 to temporarily store the EGR within the EGR pocket 238 before being released through the downstream opening 246 an into the fresh intake air conduit 220. Thus, the exemplary embodiments set forth above should not be seen as limiting the scope of the claimed subject matter.

The invention claimed is:

1. A mixer for pulsed exhaust gas recirculation (EGR), comprising:
    (a) a fresh intake air conduit having an inlet opening configured to be placed in fluid communication with a fresh intake air source;
    (b) an EGR pocket having an upstream opening in fluid communication with an upstream air source and a downstream opening in fluid communication with the fresh intake air conduit, wherein the downstream opening is smaller in size than the upstream opening; and
    (c) an EGR conduit configured to introduce pulsed EGR into the EGR pocket.

2. The mixer of claim 1, wherein the upstream air source is the fresh intake air source flowing through the fresh intake air conduit.

3. The mixer of claim 1, wherein the EGR conduit is in fluid communication with the EGR pocket through an EGR opening in the EGR pocket that is positioned closer to the downstream opening than the upstream opening.

4. The mixer of claim 1, wherein the upstream opening of the EGR pocket is positioned nearest the inlet opening of the fresh intake air conduit, and the downstream opening of the EGR pocket is positioned nearest an outlet opening of the fresh intake air conduit.

5. The mixer of claim 1, wherein the EGR pocket is disposed within an interior of the fresh intake air conduit.

6. A mixer for a pulsed exhaust gas recirculation (EGR) system having at least one EGR cylinder and at least one non-EGR cylinder, an intake manifold in fluid communication with a fresh intake air source and the at least one EGR cylinder and at least one non-EGR cylinders, and an exhaust manifold, the mixer comprising:
    (a) a fresh intake air conduit having an inlet opening configured to be placed into fluid communication with the fresh intake air source and an outlet opening configured to be placed into fluid communication with the intake manifold; and
    (b) an EGR pocket assembly, comprising:
        (i) an EGR pocket having an upstream opening in fluid communication with an upstream air source and a downstream opening in fluid communication with the fresh intake air conduit, wherein the downstream opening is smaller in size than the upstream opening; and
        (ii) an EGR conduit configured to introduce exhaust gas into the EGR pocket.

7. The mixer of claim 6, wherein the upstream air source is the fresh intake air source flowing through the fresh intake air conduit.

8. The mixer of claim 6, wherein the EGR conduit is in fluid communication with the EGR pocket through an EGR opening in the EGR pocket, the EGR opening positioned closer to the downstream opening than the upstream opening.

9. The mixer of claim 6, wherein a ratio of a cross-sectional size of the downstream opening to a cross-sectional size of the fresh intake air conduit is equal to a ratio of the at least one EGR to the at least one non-EGR cylinder.

10. The mixer of claim 6, wherein the upstream opening of the EGR pocket is positioned nearest the inlet opening of the fresh intake air conduit, and the downstream opening of the EGR pocket is positioned nearest the outlet opening of the fresh intake air conduit.

11. The mixer of claim 6, wherein the EGR pocket is disposed within an interior of the fresh intake air conduit.

12. A mixer for pulsed exhaust gas recirculation (EGR), comprising:
    (a) a fresh intake air conduit having an inlet opening configured to be placed in fluid communication with a fresh intake air source;
    (b) an EGR pocket having an upstream opening in fluid communication with an upstream air source and a downstream opening in fluid communication with the fresh intake air conduit; and
    (c) an EGR conduit configured to introduce pulsed EGR into the EGR pocket, wherein the EGR conduit is in fluid communication with the EGR pocket through an EGR opening in the EGR pocket that is positioned closer to the downstream opening than the upstream opening.

13. The mixer of claim 12, wherein the upstream air source is the fresh intake air source flowing through the fresh intake air conduit.

14. The mixer of claim 12, wherein the upstream opening of the EGR pocket is positioned nearest the inlet opening of the fresh intake air conduit, and the downstream opening of the EGR pocket is positioned nearest an outlet opening of the fresh intake air conduit.

15. The mixer of claim 12, wherein the EGR pocket is disposed within an interior of the fresh intake air conduit.

16. A mixer for pulsed exhaust gas recirculation (EGR), comprising:
    (a) a fresh intake air conduit having an inlet opening configured to be placed in fluid communication with a fresh intake air source;
    (b) an EGR pocket having an upstream opening in fluid communication with an upstream air source and a downstream opening in fluid communication with the fresh intake air conduit, wherein the upstream opening of the EGR pocket is positioned nearest the inlet opening of the fresh intake air conduit, and the downstream opening of the EGR pocket is positioned nearest an outlet opening of the fresh intake air conduit; and (c) an EGR conduit configured to introduce pulsed EGR into the EGR pocket.

17. The mixer of claim 16, wherein the upstream air source is the fresh intake air source flowing through the fresh intake air conduit.

18. The mixer of claim 16, wherein the EGR conduit is in fluid communication with the EGR pocket through an EGR opening in the EGR pocket that is positioned closer to the downstream opening than the upstream opening.

19. The mixer of claim 16, wherein the EGR pocket is disposed within an interior of the fresh intake air conduit.

20. A mixer for a pulsed exhaust gas recirculation (EGR) system having at least one EGR cylinder and at least one non-EGR cylinder, an intake manifold in fluid communication with a fresh intake air source and the at least one EGR cylinder and at least one non-EGR cylinders, and an exhaust manifold, the mixer comprising:

(a) a fresh intake air conduit having an inlet opening configured to be placed in fluid communication with the fresh intake air source and an outlet opening configured to be placed into fluid communication with the intake manifold; and (b) an EGR pocket assembly, comprising:
(i) an EGR pocket having an upstream opening in fluid communication with an upstream air source and a downstream opening in fluid communication with the fresh intake air conduit; and
(ii) an EGR conduit configured to introduce exhaust gas into the EGR pocket, wherein the EGR conduit is in fluid communication with the EGR pocket through an EGR opening in the EGR pocket, the EGR opening positioned closer to the downstream opening than the upstream opening.

\* \* \* \* \*